United States Patent
Ogishima (10) Patent No.: US 9,766,584 B1
(45) Date of Patent: Sep. 19, 2017

(54) SWITCHING POWER SUPPLY FOR ENABLING SWITCHING ELEMENT TO BE SOFT-STARTED IN BURST MODE, IMAGE FORMING APPARATUS AND SOFT START METHOD OF SWITCHING ELEMENT

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Takuya Ogishima, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/185,330

(22) Filed: Jun. 17, 2016

(51) Int. Cl.
*G03G 15/00* (2006.01)
*H02M 1/36* (2007.01)
*H02M 3/335* (2006.01)

(52) U.S. Cl.
CPC ............ *G03G 15/80* (2013.01); *H02M 1/36* (2013.01); *H02M 3/33523* (2013.01)

(58) Field of Classification Search
CPC ..... G03G 15/80; H02M 1/36; H02M 3/33523
See application file for complete search history.

(56) References Cited

U.S. PATENT DOCUMENTS

| 5,812,383 A * | 9/1998 | Majid | H02M 3/33523 363/19 |
| 2007/0164720 A1* | 7/2007 | Lalithambika | H02M 3/33507 323/288 |
| 2011/0311259 A1* | 12/2011 | Hayasaki | H02M 1/44 399/88 |
| 2013/0236203 A1* | 9/2013 | Nakajima | H02M 3/33507 399/88 |

FOREIGN PATENT DOCUMENTS

JP 2008-245419 10/2008

\* cited by examiner

*Primary Examiner* — G. M. Hyder
(74) *Attorney, Agent, or Firm* — Amin, Turocy & Watson LLP; Gregory Turocy (57) ABSTRACT

A switching power supply comprises a transformer; a switching element; a power supply control section which outputs a first gate voltage of a first pulse width consecutively for plural times when the switching element is driven in a burst mode in which the switching element is intermittently driven; a drive time control section which, based on the first gate voltage input consecutively for plural times when the switching element is driven, outputs a second gate voltage to the switching element consecutively for plural times and gradually increases a pulse width of the second gate voltage to a first pulse width from a second pulse width narrower than the first pulse width; and a switching section to which a feedback voltage is input which switches an input destination of the first gate voltage output by the power supply control section from the switching element to the drive time control section in the burst mode.

18 Claims, 8 Drawing Sheets

| GATE VOLTAGE Vg | COUNTER INFORMATION | | | | Vcc=5V | | |
|---|---|---|---|---|---|---|---|
| | Q0 | Q1 | Q2 | Q3 | GREATER THAN R(kΩ) | SMALLER THAN R(kΩ) | COMPARISON VOLTAGE Vh(V) |
| FIRST PULSE | Low | Low | Low | Low | 91 | 10 | 0.5 |
| SECOND PULSE | Low | Low | Low | High | 82 | 22 | 1.1 |
| ⋮ | ⋮ | ⋮ | ⋮ | ⋮ | ⋮ | ⋮ | ⋮ |
| FIFTEENTH PULSE | High | High | High | Low | 30 | 68 | 3.5 |
| SIXTEENTH PULSE | High | High | High | High | 22 | 82 | 3.9 |

SWITCHING POWER SUPPLY FOR ENABLING SWITCHING ELEMENT TO BE SOFT-STARTED IN BURST MODE, IMAGE FORMING APPARATUS AND SOFT START METHOD OF SWITCHING ELEMENT

FIELD

Embodiments described herein generally relate to a switching power supply for enabling a switching element to be soft-started in a burst mode.

BACKGROUND

A switching power supply for converting an alternating current to a direct current is known. There is a device serving as the switching power supply which includes a burst mode (standby state) and is used in an image forming apparatus. The switching power supply executes full-wave rectification on an alternating current input with a diode bridge to generate a high-voltage direct current. The high-voltage direct current is input to a primary winding of a transformer. If a switching element is switched at a high frequency, a secondary winding of the transformer outputs a voltage. The output voltage of the secondary winding is rectified and smoothed by a diode and a capacitor to a low-voltage direct current. The output voltage of the secondary winding is used by a processor for controlling the whole of the image forming apparatus.

If the switching power supply is constituted as a flyback converter, there is an advantage in that the whole power conversion efficiency from the alternating current to the low-voltage direct current obtained by being rectified and smoothed becomes greater than or equal to 80%.

However, in the image forming apparatus, the time of a standby state is completely longer than the time required in printing. Thus, a method of stopping power supply to a motor arranged in the image forming apparatus at the time of the standby state is adopted.

On the other hand, as functions such as waiting for a print job, receiving a fax and the like from a network are enabled in advance, it is necessary that the electric power is supplied to the processor at the time of the standby state. Generally, a power supply requiring a large current has high efficiency at the time of the large current, and a power supply requiring a small current has high efficiency at the time of the small current. If a power supply for control used at the normal time and a power supply used in the standby state are arranged in the image forming apparatus and the two power supplies are switched in response to the state of the image forming apparatus, the cost becomes high.

In order to deal with a point that the power loss is large at the time of the completely long standby state, a method of intermittently driving the switching element at the time of the standby state is adopted as a burst mode. Through this method, switching times can be reduced and the switching loss can also be reduced.

However, if the burst mode is used, a ripple of the output voltage of the secondary winding becomes large, and thus the burden of circuit design at the rear stage becomes large and the cost is increased.

DETAILED DESCRIPTION

Generally, in accordance with an embodiment, a switching power supply comprises a transformer, a switching element, a power supply control section, a drive time control section and a switching section. The transformer is equipped with a primary winding, a secondary winding and an auxiliary winding. The switching element enables the secondary winding and the auxiliary winding to generate voltages through switching operations for turning on and turning off an input voltage to the primary winding. The power supply control section to which an output voltage of the auxiliary winding is input outputs a first gate voltage of a first pulse width at the time the switching element is driven consecutively for plural times in a burst mode in which the switching element is intermittently driven. The drive time control section, based on the first gate voltage input consecutively for plural times at the time the switching element is driven, outputs a second gate voltage to the switching element consecutively for plural times and gradually increases a pulse width of the second gate voltage to the first pulse width from a second pulse width smaller than the first pulse width. The switching section to which an output voltage of the secondary winding is input as a feedback voltage switches an input destination of the first gate voltage output by the power supply control section from the switching element to the drive time control section based on the feedback voltage in the burst mode.

Generally, in accordance with the present embodiment, an image forming apparatus comprises a transformer, a switching element, a power supply control section, a drive time control section, a switching section, an image forming section and a processor. The transformer is equipped with a primary winding, a secondary winding and an auxiliary winding. The switching element enables the secondary winding and the auxiliary winding to generate voltages through switching operations for turning on and turning off an input voltage to the primary winding. The power supply control section to which an output voltage of the auxiliary winding is input outputs a first gate voltage of a first pulse width consecutively for plural times at the time the switching element is driven in a burst mode in which the switching element is intermittently driven. The drive time control section, based on the first gate voltage input consecutively for plural times at the time the switching element is driven, outputs a second gate voltage to the switching element consecutively for plural times and gradually increases a pulse width of the second gate voltage to the first pulse width from a second pulse width smaller than the first pulse width. The switching section to which an output voltage of the secondary winding is input as a feedback voltage switches an input destination of the first gate voltage output by the power supply control section from the switching element to the drive time control section based on the feedback voltage in the burst mode. The image forming section to which a voltage is input through a line branching from a line between the primary winding and an alternating current power supply for supplying electric power to the primary winding transfers a toner image on a photoconductor onto a sheet. The processor to which the output voltage of the secondary winding is input controls the image forming section.

Generally, in accordance with the present embodiment, a soft start method of a switching element is executed by a switching power supply including a transformer equipped with a primary winding, a secondary winding and an auxiliary winding and a switching element in a burst mode in which the switching element is intermittently driven. In the method, a power supply control section to which an output voltage of an auxiliary winding is input outputs a first gate voltage of a first pulse width consecutively for plural times at the time the switching element is driven in the burst mode. In the method, a drive time control section, based on a first gate voltage input consecutively for plural times at the time the switching element is driven, outputs a second gate voltage to the switching element consecutively for plural times and gradually increases a pulse width of the second gate voltage to the first pulse width from a second pulse width narrower than the first pulse width. In the method, a switching section to which an output voltage of the secondary winding is input as a feedback voltage switches an input destination of the first gate voltage output by the power supply control section from the switching element to a drive time control section based on the feedback voltage in the burst mode.

(Description of the Whole Constitution)

The present embodiment is described with reference to the accompanying drawings.

Figure 1:
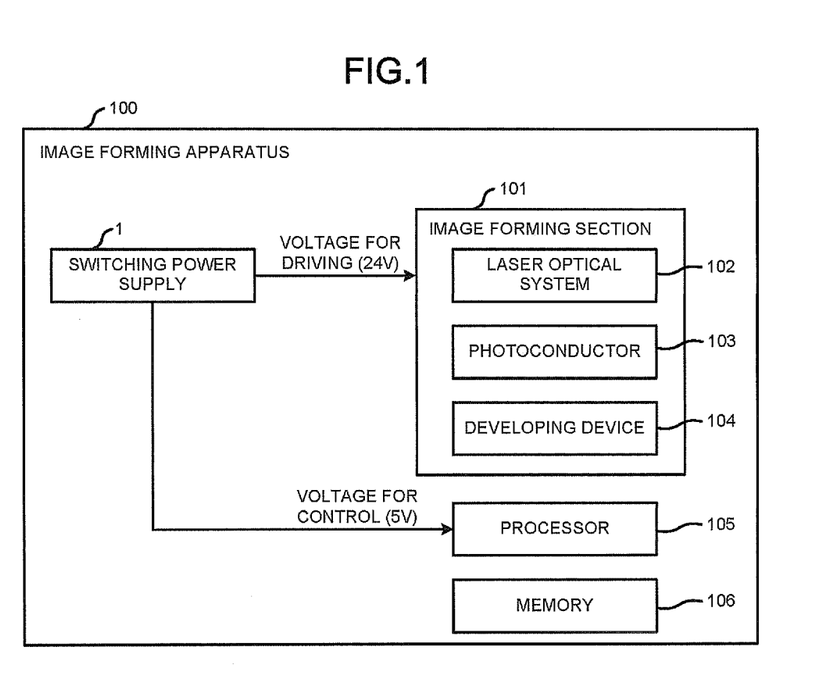
FIG. 1 is a diagram illustrating components of an image forming apparatus.

FIG. 1 is a diagram illustrating components of an image forming apparatus 100.

The image forming apparatus 100 includes an image forming section 101, a processor 105, a memory 106 and a switching power supply 1. The image forming section 101 forms an electrostatic latent image on a photoconductor 103 through a laser optical system 102. The image forming section 101 develops the electrostatic latent image with a developing device 104 to form a toner image on the photoconductor 103. The image forming section 101 transfers the toner image on the photoconductor 103 onto a sheet. The processor 105 controls the whole of the image forming apparatus 100 through reading programs stored in the memory 106.

Figure 2:
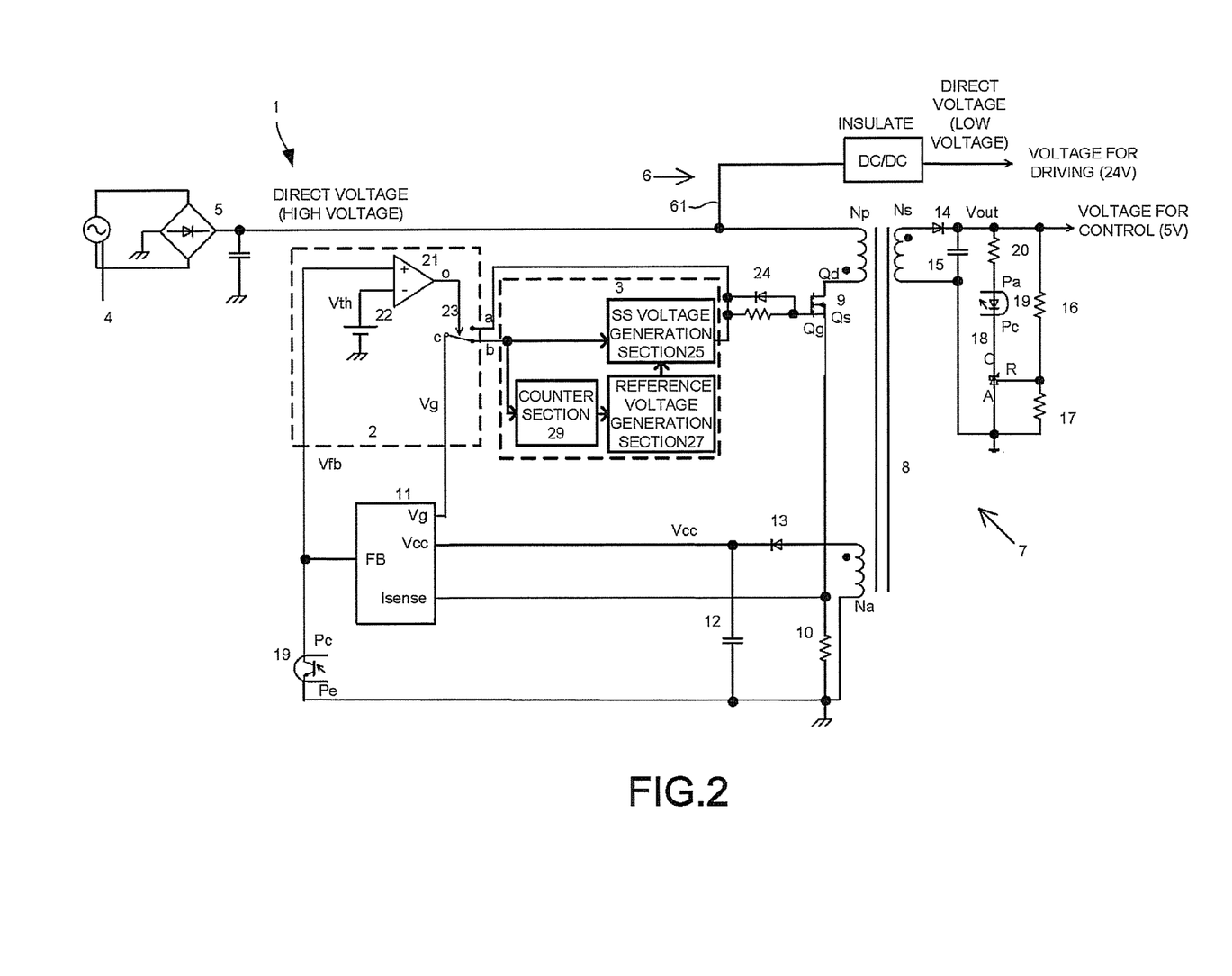
FIG. 2 is a diagram illustrating the circuit structure of a switching power supply.

FIG. 2 is a diagram illustrating the circuit structure of the switching power supply 1.

An alternating current power supply 4 supplies the electric power to the switching power supply 1 including a burst mode (standby state). A diode bridge 5 is connected with the alternating current power supply 4. There are two large circuit blocks at the rear stage of the diode bridge 5. One is a drive voltage generation block 6 used to generate a voltage for driving a motor and the like of the image forming section 101. The other is a control voltage generation block 7 used to generate a voltage for the control of the processor 105 and the like. A voltage is input to the drive voltage generation block 6 through a line 61 branching from a line between the diode bridge 5 and a primary winding Np.

(Control Voltage Generation Block 7)

A terminal of one side of the primary winding Np of a transformer 8 is connected with the rear stage of the diode bridge 5. A terminal of the other side of the primary winding Np is connected with a drain terminal Qd of a switching element 9. A source terminal Qs of the switching element 9 is connected with a current detection resistance 10 and an Isense terminal serving as a current detection terminal of a power supply control section 11. A primary side circuit is a circuit to which a high-voltage direct current voltage is applied.

Further, a terminal of one side of an auxiliary winding Na of the transformer 8 is connected with a Vcc (supply of power source) terminal of the power supply control section 11 via a capacitor 12 and a diode 13. A terminal of the other side of the auxiliary winding Na is connected to primary side reference potential together with a current detection resistance 10 and the capacitor 12.

The transformer 8 is equipped with the primary winding Np, a secondary winding Ns, the auxiliary winding Na and cores (not shown) for winding those windings.

The secondary winding Ns is insulated from the primary winding Np. A capacitor 15 and a diode 14 for rectifying and smoothing are connected with the secondary winding Ns. An output voltage of the secondary winding Ns becomes an output voltage Vout through the diode 14 and the capacitor 15. A terminal of one side of a resistance 16 is connected with the diode 14 and a terminal of the other side thereof is connected with a resistance 17. A terminal R of a shunt regulator 18 is connected with a connection point of the two voltage dividing resistances 16 and 17.

The terminal A of the shunt regulator 18 is connected with a secondary side reference potential together with the capacitor 15, the resistance 17 and the secondary winding Ns. A terminal C of the shunt regulator is connected with a cathode terminal Pc of a photocoupler 19. An anode terminal Pa of the photocoupler 19 is connected with a terminal of one side of a resistance 20 for restricting the current. A terminal of the other side of the resistance 20 is connected with the diode 14. An emitter terminal Pe of the photocoupler 19 is connected with the primary side reference potential. A collector terminal Pc of the photocoupler 19 is connected with an FB terminal serving as a feedback terminal of the power supply control section 11.

(Switching Section)

The FB terminal of the power supply control section 11 is connected with a switching section 2. The switching section 2 is equipped with a comparator 21 for detecting a voltage Vfb of the FB terminal, a burst mode detection voltage 22 for applying a reference voltage Vth to the comparator 21 and an SPDT (Single Pole Single Throw) switch 23.

A common terminal c of the SPDT switch 23 is connected with a Vg terminal of the power supply control section 11 for outputting a gate voltage Vg (first gate voltage). A terminal a of the SPDT switch 23 is connected with a drive circuit 24 for driving the switching element 9. The drive circuit 24 is connected with a gate terminal Qg of the switching element 9. A terminal b of the SPDT switch 23 is connected with the drive time control section 3.

(Drive Time Control Section)

The drive time control section 3 is equipped with an SS (soft start) voltage generation section 25, a counter section 29 and a reference voltage generation section 27.

Figure 3:
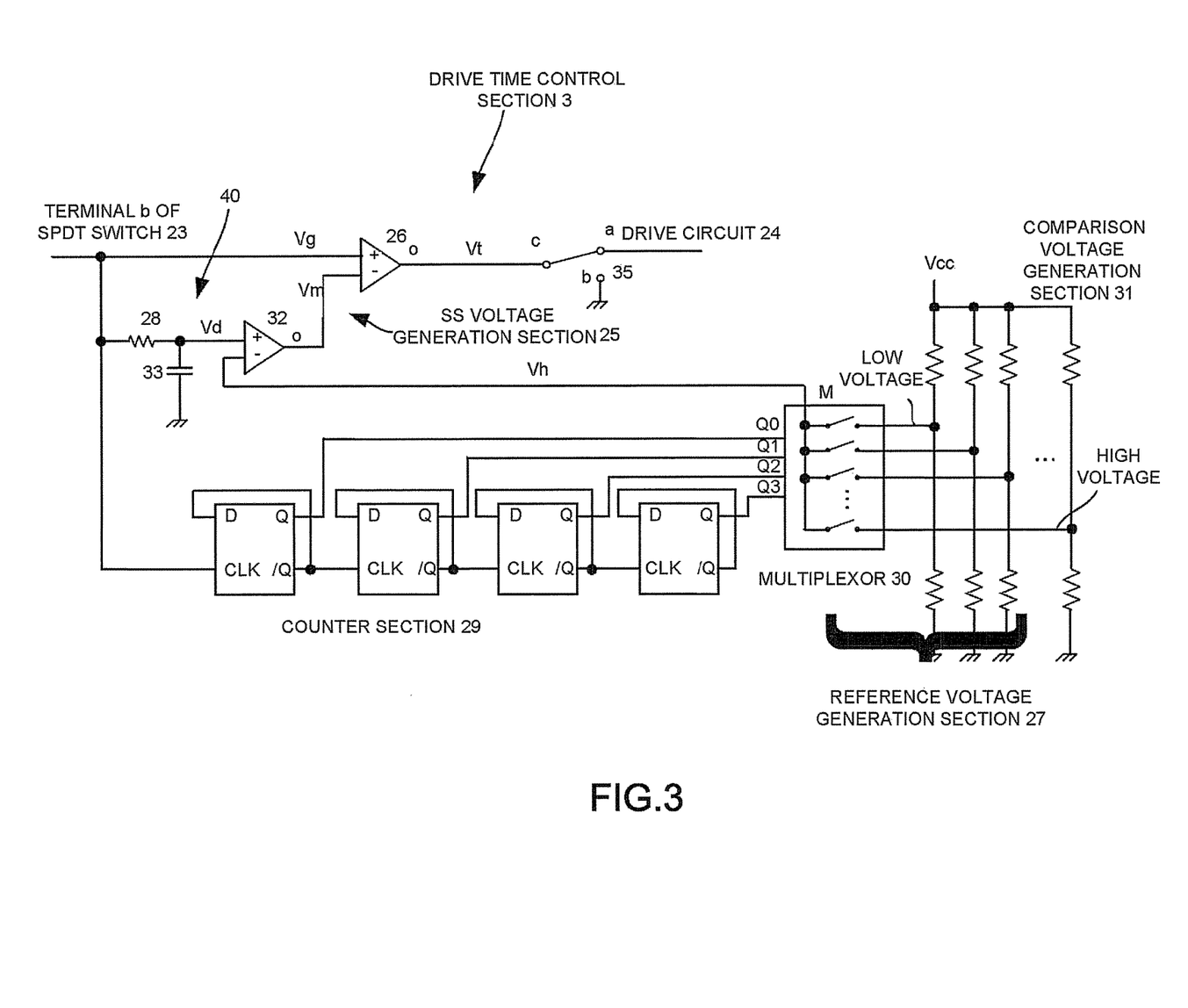
FIG. 3 is a diagram illustrating the circuit structure of a drive time control section.

FIG. 3 is a diagram illustrating the circuit structure of the drive time control section 3.

The terminal b of the SPDT switch 23 is connected with a comparator 26, a resistance 28 constituting a delay circuit 40 and a block terminal CLK of a D flip-flop constituting a counter section 29. The counter section 29 is a 4-bit counter. Counter information Q0, Q1, Q2 and Q3 of the counter section 29 is input to a multiplexor 30 at the rear stage of the counter section 29.

(Reference Voltage Generation Section)

A reference voltage generation section 27 is equipped with the multiplexor 30 and a comparison voltage generation section 31. The multiplexor 30 switches 16 switches based on the counter information Q0~Q3. Each switch of the multiplexor 30 is connected with the comparison voltage generation section 31. The comparison voltage generation section 31 generates voltage from a low voltage to a high voltage through resistances with different voltage dividing ratios on the basis of the Vcc voltage. The comparison voltage generation section 31 applies the generated voltage to each switch of the multiplexor 30. The voltage refers to a comparison voltage Vh. The comparison voltage generation section 31 generates the comparison voltage Vh used in the burst mode. The comparison voltage generation section 31 changes the comparison voltage Vh in response to accumulated input times of the gate voltage Vg at the time the switching element 9 is driven.

Figure 4:
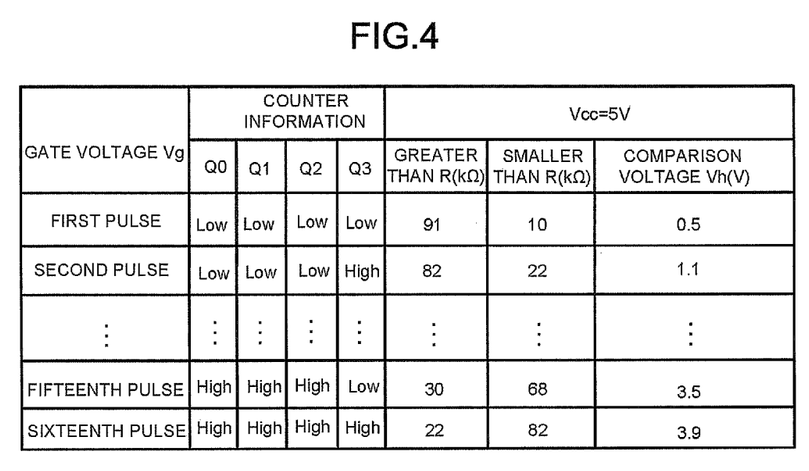
FIG. 4 is a diagram illustrating an example of a comparison voltage corresponding to counter information.

FIG. 4 is a diagram illustrating an example of the comparison voltage Vh corresponding to the counter information Q0~Q3.

The comparison voltage generation section 31 uses resistances of an E24 series. In a case in which the counter information Q0 is Low, the counter information Q1 is Low, the counter information Q2 is Low and the counter information Q3 is Low, the comparison voltage Vh becomes the minimum. In a case in which the counter information Q0 is High, the counter information Q1 is High, the counter information Q2 is High and the counter information Q3 is High, the comparison voltage Vh becomes the maximum.

(SS Voltage Generation Section)

Return to FIG. 3, an SS voltage generation section 25 is equipped with a delay circuit 40, a comparator 32 (first comparator) and a comparator 26 (second comparator). The common terminal M of the multiplexor 30 outputs the comparison voltage Vh to an −input terminal of the comparator 32.

A delay circuit 40 equipped with the resistance 28 and the capacitor 33 inputs a delay voltage Vd to an +input terminal of the comparator 32.

An output terminal O of the comparator 32 outputs an intermediate voltage Vm to the −input terminal of the comparator 26. An +input terminal of the comparator 26 is connected with the terminal b of the SPDT switch 23. The output terminal O of the comparator 26 is connected with a common terminal c of a SPDT switch 35 and outputs a standby gate voltage Vt (second gate signal). A terminal a of the SPDT switch 35 is connected with the drive circuit 24 and a terminal b thereof is connected with the primary side reference potential.

(Description of Circuit Operation)

An operation of the control voltage generation block 7 is described.

Return to FIG. 2, a high-voltage direct current voltage is input to the primary winding Np from the alternating current power supply 4 via the diode bridge 5. If the switching element 9 is switched at a high frequency, a voltage is generated in the auxiliary winding Na and the secondary winding Ns. The output voltage of the auxiliary winding Na is rectified and smoothed and is used as a power supply section Vcc of the power supply control section 11. The output voltage of the secondary winding Ns is rectified and smoothed to become an output voltage Vout. The output voltage Vout is input to the processor 105. In the transformer 8, polarity of the primary winding Np and that of the secondary winding Ns are different. When the switching element 9 is turned on, the transformer 8 accumulates energy. If the switching element 9 is switched off, the transformer 8 releases the accumulated energy. In this way, a voltage is generated in the auxiliary winding Na and the secondary winding Ns.

(Brief of Feedback Mechanism)

The brief of the feedback mechanism with respect to the change of the output voltage Vout in a normal mode is described. The SPDT switch 23 is connected with the terminal a. The gate voltage Vg output by the power supply control section 11 is input to the switching element 9 (drive circuit 24) without passing the drive time control section 3.

The detection voltage of the output voltage Vout divided by the resistance 16 and the resistance 17 is input to the terminal R of the shunt regulator 18. The shunt regulator 18 compares the detection voltage with the reference voltage therein. If the output voltage Vout increases and the detection voltage is higher than the reference voltage, the shunt regulator 18 turns on the output transistor therein. In this way, the photo diode of the photocoupler 19 is conducted.

If the photo diode is conducted, a current flows between the collector terminal Pc and the emitter terminal Pe of the photo transistor of the photocoupler 19. The FB terminal of the power supply control section 11 is connected with a pull-up resistance, and if a current flows between the collector terminal Pc and the emitter terminal Pe, the voltage Vfb of the FB terminal of the power supply control section 11 decreases. Hereinafter, the flow of the current between the collector terminal Pc and the emitter terminal Pe is referred to the input of a feedback signal to the photocoupler 19. The voltage Vfb is referred to a feedback voltage Vfb. If the feedback voltage Vfb decreases, the power supply control section 11 narrows the pulse width of the gate voltage Vg. If the pulse width of the gate voltage Vg is narrowed, the output voltage Vout decreases presently.

On the contrary, if the output voltage Vout decreases, and the detection voltage is smaller than the reference voltage of the shunt regulator 18, the reverse mechanism works and the output voltage Vout increases.

Figure 5:
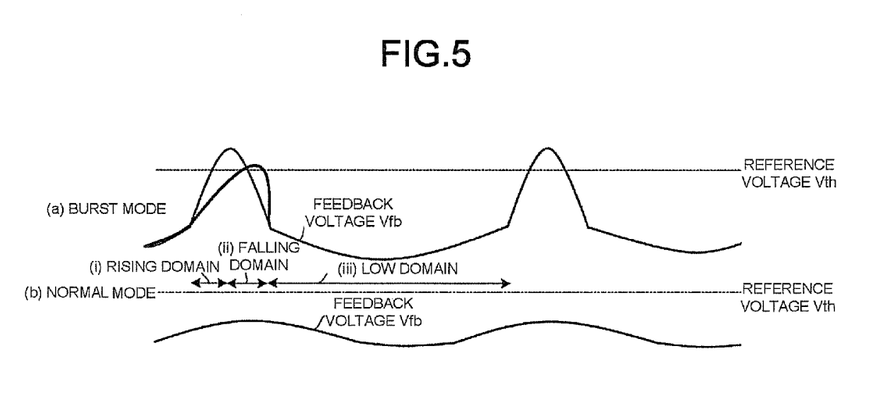
FIG. 5 is a diagram illustrating waveforms of feedback voltages in a burst mode and in a normal mode.

FIG. 5 is a diagram illustrating waveforms of the feedback voltages Vfb in (a) the burst mode and in (b) the normal mode.

(Burst Mode Operation)

In the burst mode of the image forming apparatus 100, the switching power supply 1 enters the burst mode.

In (a) the burst mode, the switching element 9 is intermittently driven. At the time the switching element 9 is driven, the power supply control section 11 concentrates the gate voltage Vg and outputs the gate voltage Vg with about several pulses-dozens of pulses. At the time, according to the later-described principle, the SPDT switch 23 is connected with the terminal b. The gate voltage Vg output by the power supply control section 11 is input to the drive time control section 3.

Based on the gate voltage Vg, the drive time control section 3 outputs the gate voltage Vt to the switching element 9 consecutively for plural times to drive the switching element 9. The effect thereof is described later.

Hereinafter, the detection principle of the burst mode by the comparator 21 is described. The SPDT switch 23 is initially connected with the terminal a.

(i) Rising domain: the output voltage Vout decreases (refer to FIG. 7), a current does not flow between the collector terminal PC and the emitter terminal Pe of the photocoupler 19 and the feedback signal is not input. In this way, the feedback voltage Vfb sharply increases. At the time, according to the fact that the feedback voltage Vfb is greater than the reference voltage Vth, the comparator 21 detects that the mode is the burst mode. The comparator 21 switches the SPDT switch 23 from the terminal a to the terminal b.

(ii) Falling domain: through the concentrated switching operation of the switching element 9 in the burst mode, the output voltage Vout increases (refer to FIG. 7), the feedback signal is input to the photocoupler 19. In this way, the feedback voltage Vfb decreases. At the time, according to the fact that the feedback voltage Vfb is smaller than the reference voltage Vth, the comparator 21 detects that the mode is not the burst mode. The comparator 21 switches the SPDT switch 23 from the terminal b to the terminal a.

(iii) Low domain: the consumption power is small due to the load of the processor 105 and a high output voltage Vout is maintained. The change of the output voltage Vout is small. In the low domain, as the output voltage Vout is high, the feedback signal is input to the photocoupler 19. The feedback voltage Vfb becomes a low voltage and is maintained to be smaller than the reference voltage Vth.

In (b) the normal mode, the average of the feedback voltages Vfb is greater than that of the feedback voltages Vfb in (a) the burst mode, and the difference between the peak and the valley thereof is small. The reference voltage Vth of the comparator 21 is greater than the range of the change of the feedback voltage Vfb in the normal mode and is smaller than the peak of the feedback voltage Vfb in the burst mode. Thus, the comparator 21 can detect the burst mode. In this way, the switching section 2 uses the difference in height of the feedback voltages Vfb of the FB terminals in the normal mode and in the burst mode to detect the burst mode.

In other words, the output voltage Vout of the secondary winding Ns is input to the switching section 2 as the feedback voltage Vfb. The switching section 2 switches an input destination of the gate voltage Vg output by the power supply control section 11 from the switching element 9 to the drive time control section 3 based on the feedback voltage Vfb in the burst mode.

If the SPDT switch 23 is switched to the terminal b, the gate voltage Vg is input to the drive time control section 3. The drive time control section 3 outputs the gate voltage Vt to the drive circuit 24.

(Operation of Drive Time Control Section)

Figure 6:
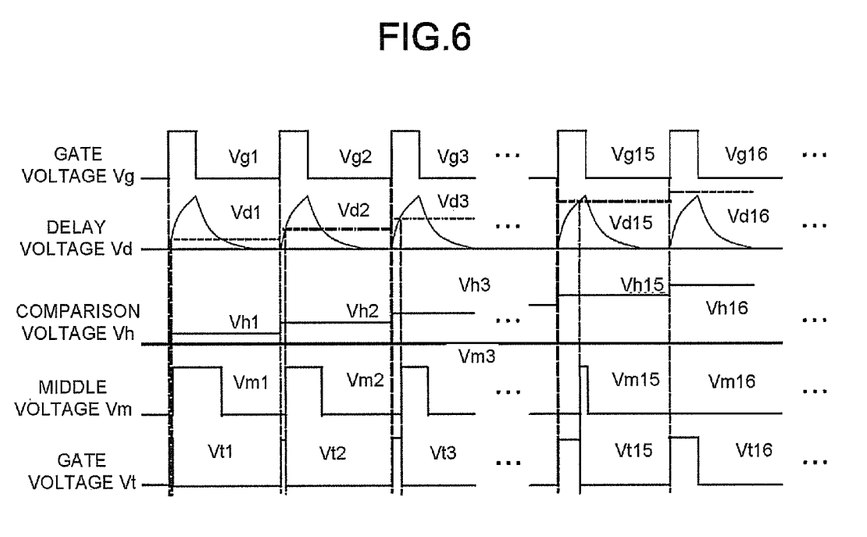
FIG. 6 is a diagram illustrating a waveform of each section in the drive time control section in the burst mode.

FIG. 6 is a diagram illustrating a waveform of each section in the drive time control section 3 in the burst mode.

In the burst mode, the gate voltage Vg is input to the +input terminal of the comparator 26. At the time the switching element 9 is driven in the burst mode, the power supply control section 11 concentrates the gate voltage Vg and outputs the gate voltage Vg about several pulses-dozens of pulses.

The delay circuit 40 adds a delay voltage Vd to the +input terminal of the comparator 32 based on the gate voltage Vg. The counter section 29 counts the accumulated input times of the gate voltage Vg at the time the switching element 9 is driven. The counter section 29 outputs 4-bit accumulated input times of the gate voltage Vg as the counter information Q0~Q3. Based on the output of the counter information, the multiplexor 30 changes the switch.

For example, for the initial gate voltage Vg1, if the counter information Q0 is Low, the counter information Q1 is Low, the counter information Q2 is Low, and the counter information Q3 is Low, the multiplexor 30 selects the comparison voltage Vh=0.5V. Similarly, for the sixteenth gate voltage Vg16, if the counter information Q0 is High, the counter information Q1 is High, the counter information Q2 is High, and the counter information Q3 is High, the multiplexor 30 selects the comparison voltage Vh=3.9V.

The reference voltage generation section 27 switches the height of the output comparison voltage Vh every time the gate voltage Vg is input at the time the switching element 9 is driven and increases the comparison voltage Vh in response to the accumulated input times of the gate voltage Vg.

The comparators 32 and 26 output the gate voltage Vt every time the comparison voltage Vh is input and widen the pulse width of the gate voltage Vt in response to the height of the comparison voltage Vh.

The delay circuit 40 outputs the delay voltage Vd every time the gate voltage Vg is input.

The comparator 32, if the delay voltage Vd is higher than the comparison voltage Vh, outputs the intermediate voltage Vm the height of which is the same as the gate voltage Vg from the output terminal O to the comparator 26.

The comparator 26 outputs the gate voltage Vt from the output terminal O if the gate voltage Vg is higher than the intermediate voltage Vm.

(Gate Voltage and Effect)

As shown in FIG. 6, the gate voltage Vt1 has a very narrow pulse width with respect to the gate voltage Vg 1, and the second gate voltage Vt2 has a wider voltage pulse than the first gate voltage Vt1. In the present embodiment, the pulse width of the gate voltage Vt gradually becomes wide until the sixteenth gate voltage Vt16. Further, when the switching element 9 is intermittently driven at the second time, at the time the first gate voltage Vg is input, the reference voltage generation section 27 outputs the lowest comparison voltage Vh again. Then, the reference voltage generation section 27 gradually outputs the high comparison voltages Vh. In this way, the drive time control section 3 starts to output the gate voltage Vt the pulse width of which is narrow again, and gradually widens the pulse widths of the gate voltages Vt.

Figure 7:
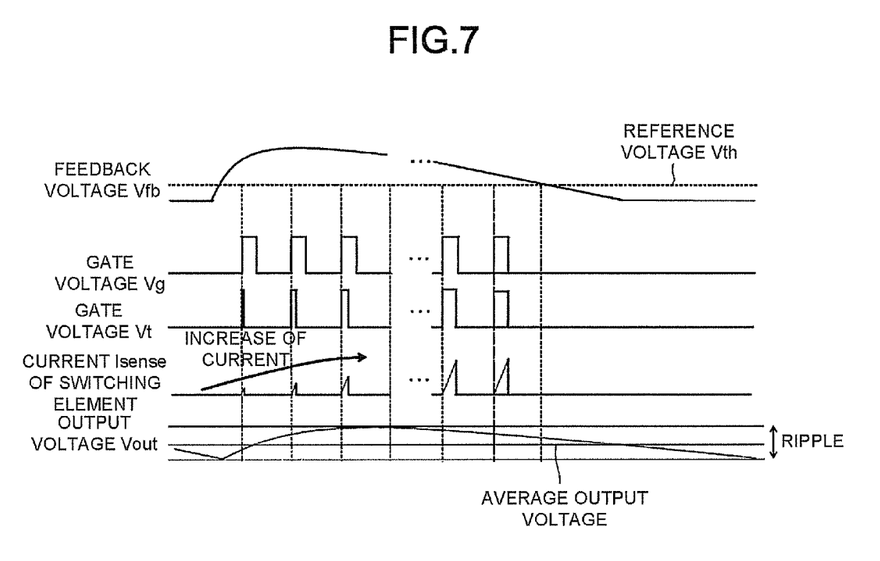
FIG. 7 is a diagram illustrating a relation between a current Isense and an output voltage Vout.

FIG. 7 is a diagram illustrating a relation between a current Isense and the output voltage Vout.

In the present embodiment, in the burst mode, at the time the switching element 9 is driven, as the pulse widths of the gate voltages Vt are gradually widened, the switching element 9 can be soft-started. In this way, in the present embodiment, the sharp increase of the current Isense flowing to the switching element 9 can be suppressed and a ripple of the output voltage Vout can also be suppressed.

In the present embodiment, through executing a soft start operation in the burst mode, the output voltage Vout can be started slowly and the peak of the output voltage Vout can be suppressed. In this way, in the present embodiment, ripple noise appearing in the output voltage Vout can be reduced. Thus, in the present embodiment, the design load of the circuit at the rear stage of the switching power supply 1 can be lightened.

In the present embodiment, an IC or a combination of individual components is assumed as a device used in the switching section 2 and the drive time control section 3. However, the device used in the switching section 2 and the drive time control section 3 may be programmable FPGA (Field Programmable Gate Array). In the case of using the FPGA, functions can be summarized in one package, thus the packaging area of the component can be reduced.

Further, as the switching power supply 1 can be realized even through the addition of the function to the switching power supply of the conventional image forming apparatus, compared with a case of newly designing a switching power supply, the design time can be reduced and the low cost can be realized.

In the present embodiment, the counter section 29 counts the gate signal Vg through the 4-bit counter; however, it is not limited to this. The gate signal Vg may be counted through a 8-bit counter or a 32-bit counter. The reference voltage generation section 27, for example, until the gate signal Vg of 8 pulses is input, gradually increases the comparison voltage Vh, and if the gate signal Vg of 9 or more pulses is input, may output a constant comparison voltage Vh.

The drive time control section 3 gradually widens the pulse width of the gate signal Vt until the gate signal Vg of 8 pulses is input, and may output the gate signal Vt of a constant pulse width if the gate signal Vg of 9 or more pulses is input.

Figure 8:
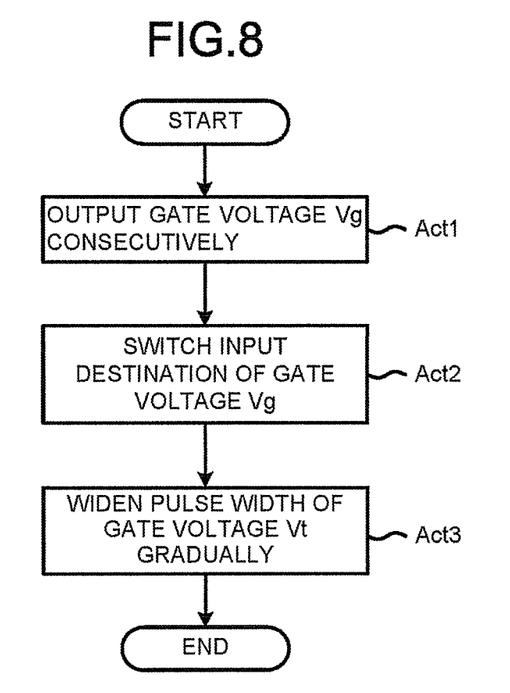
FIG. 8 is a flowchart illustrating a soft start processing.

FIG. 8 is a flowchart illustrating a soft start processing.

The soft start processing refers to a processing of intermittently driving the switching element 9 by the switching power supply 1 in the burst mode.

The power supply control section 11 to which the output voltage of the auxiliary winding Na is input outputs the gate voltage Vg (first gate voltage) of the first pulse width consecutively for plural times at the time the switching element 9 is driven in the burst mode (Act 1).

The switching section 2 to which the output voltage Vout of the secondary winding Ns is input as the feedback voltage Vfb switches the input destination of the gate voltage Vg output by the power supply control section 11 from the switching element 9 to the drive time control section 3 based on the feedback voltage Vfb in the burst mode (Act 2).

The drive time control section 3, based on the gate voltage Vg input consecutively for plural times at the time the switching element 9 is driven, outputs the gate voltage Vt (second gate voltage) to the switching element 9 consecutively for plural times. The drive time control section 3 gradually widens the pulse width of the gate voltage Vt from the second pulse width narrower than the first pulse width to the first pulse width (Act 3).

As stated above in detail, according to the technology described herein, the ripple appearing in the output voltage of the secondary winding in the burst mode can be suppressed and the load of the circuit design at rear stage of the secondary winding can be reduced.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A switching power supply, comprising:
a transformer configured to be equipped with a primary winding, a secondary winding and an auxiliary winding;
a switching element configured to enable the secondary winding and the auxiliary winding to generate a voltage through switching operations for turning on and turning off an input voltage to the primary winding;
a power supply control section configured to be a power supply control section to which an output voltage of the auxiliary winding is input and output a first gate voltage of a first pulse width consecutively for plural times at the time the switching element is driven in a burst mode in which the switching element is intermittently driven;
a drive time control section configured, based on the first gate voltage input consecutively for plural times at the time the switching element is driven, to output a second gate voltage to the switching element consecutively for plural times and gradually increase a pulse width of the second gate voltage to the first pulse width from a second pulse width narrower than the first pulse width; and
a switching section to which an output voltage of the secondary winding is input as a feedback voltage configured to switch an input destination of the first gate voltage output by the power supply control section from the switching element to the drive time control section based on the feedback voltage in the burst mode.

2. The switching power supply according to claim 1, wherein
the drive time control section is equipped with a comparison voltage change section configured to switch height of an output comparison voltage at the time the switching element is driven every time the first gate voltage is input and increase the comparison voltage in response to accumulated input times of the first gate voltage, and a comparator configured to output a second gate voltage every time the comparison voltage is input and widen the pulse width of the second gate voltage in response to the height of the comparison voltage.

3. The switching power supply according to claim 2, wherein
the drive time control section is equipped with a delay circuit configured to output a delay voltage every time the first gate voltage is input; and
the comparator is equipped with a first comparator configured to output an intermediate voltage the height of which is the same as the first gate voltage if the delay voltage is higher than the comparison voltage and a second comparator configured to output the second gate voltage if the first gate voltage is higher than the intermediate voltage.

4. The switching power supply according to claim 3, wherein
the delay circuit is equipped with a resistance connected with the switching section and a capacitor one end of which is connected with a point between the resistance and the first comparator, the other end thereof is connected with a reference potential.

5. The switching power supply according to claim 2, wherein
the comparison voltage change section is equipped with a counter section configured to count the accumulated input times of the first gate voltage and a reference voltage generation section configured to switch the comparison voltage to be higher if the count times of the counter section are increased.

6. The switching power supply according to claim 1, wherein
the primary winding and the secondary winding are insulated from each other.

7. The switching power supply according to claim 1, wherein if the input voltage to the primary winding is turned off from the ON state, the secondary winding outputs a voltage.

8. The switching power supply according to claim 1, wherein
the power supply control section detects a current flowing to the switching element.

9. An image forming apparatus, comprising:
a transformer configured to be equipped with a primary winding, a secondary winding and an auxiliary winding;
a switching element configured to enable the secondary winding and the auxiliary winding to generate a voltage through switching operations for turning on and turning off an input voltage to the primary winding;
a power supply control section to which an output voltage of the auxiliary winding is input configured to output a first gate voltage of a first pulse width consecutively for plural times at the time the switching element is driven in a burst mode in which the switching element is intermittently driven;
a drive time control section configured, based on the first gate voltage input consecutively for plural times at the time the switching element is driven, to output a second gate voltage to the switching element consecutively for plural times and gradually increase a pulse width of the second gate voltage to the first pulse width from a second pulse width narrower than the first pulse width;
a switching section to which an output voltage of the secondary winding is input as a feedback voltage configured to switch an input destination of the first gate voltage output by the power supply control section from the switching element to the drive time control section based on the feedback voltage in the burst mode;
an image forming section to which a voltage is input through a line branching from a line between the primary winding and an alternating current power supply for supplying electric power to the primary winding configured to transfer a toner image on a photoconductor onto a sheet; and
a processor to which the output voltage of the secondary winding is input configured to control the image forming section.

10. The image forming apparatus according to claim 9, wherein
the drive time control section is equipped with a comparison voltage change section configured to switch height of an output comparison voltage at the time the switching element is driven every time the first gate voltage is input and increase the comparison voltage in response to accumulated input times of the first gate voltage, and a comparator configured to output a second gate voltage every time the comparison voltage is input and widen the pulse width of the second gate voltage in response to the height of the comparison voltage.

11. The image forming apparatus according to claim 9, wherein the primary winding and the secondary winding are insulated from each other.

12. The image forming apparatus according to claim 9, wherein if the input voltage to the primary winding is turned off from the ON state, the secondary winding outputs a voltage.

13. The image forming apparatus according to claim 9, wherein the power supply control section detects a current flowing to the switching element.

14. A soft start method of a switching element executed by a switching power supply including a transformer equipped with a primary winding, a secondary winding and an auxiliary winding and the switching element in a burst mode in which the switching element is intermittently driven, including:
outputting a first gate voltage of a first pulse width consecutively for plural times at the time the switching element is driven in the burst mode by a power supply control section to which an output voltage of the auxiliary winding is input;
outputting a second gate voltage to the switching element consecutively for plural times based on the first gate voltage input consecutively for plural times at the time the switching element is driven and gradually increasing a pulse width of the second gate voltage to the first pulse width from a second pulse width narrower than the first pulse width by a drive time control section; and
switching an input destination of the output first gate voltage output by the power supply control section from the switching element to the drive time control section based on a feedback voltage in the burst mode by a switching section to which an output voltage of the secondary winding is input as feedback voltage.

15. The soft start method of the switching element according to claim 14, wherein the drive time control section is equipped with a comparison voltage change section configured to switch height of an output comparison voltage at the time the switching element is driven every time the first gate voltage is input, and a comparator configured to output a second gate voltage every time the comparison voltage is input.

16. The soft start method of the switching element according to claim 15, wherein the comparison voltage change section configured to increase the comparison voltage in response to accumulated input times of the first gate voltage, and the comparator configured to widen the pulse width of the second gate voltage in response to the height of the comparison voltage.

17. The soft start method of the switching element according to claim 14, wherein if the input voltage to the primary winding is turned off from the ON state, the secondary winding outputs a voltage.

18. The soft start method of the switching element according to claim 14, further comprising detecting a current flowing to the switching element by the power supply control section.

* * * * *